Oct. 12, 1948.  R. A. PYLE  2,451,118
FLUID TRANSMISSION
Filed Nov. 20, 1945  3 Sheets—Sheet 1

Inventor
ROBERT A. PYLE
By Clarence A. O'Brien
and Harvey B. Jackson
Attorneys

Oct. 12, 1948.  R. A. PYLE  2,451,118
FLUID TRANSMISSION
Filed Nov. 20, 1945  3 Sheets—Sheet 2

Inventor
ROBERT A. PYLE
By Clarence A. O'Brien
and Harvey B. Jacobson
Attorneys

Oct. 12, 1948.    R. A. PYLE    2,451,118
FLUID TRANSMISSION
Filed Nov. 20, 1945    3 Sheets-Sheet 3
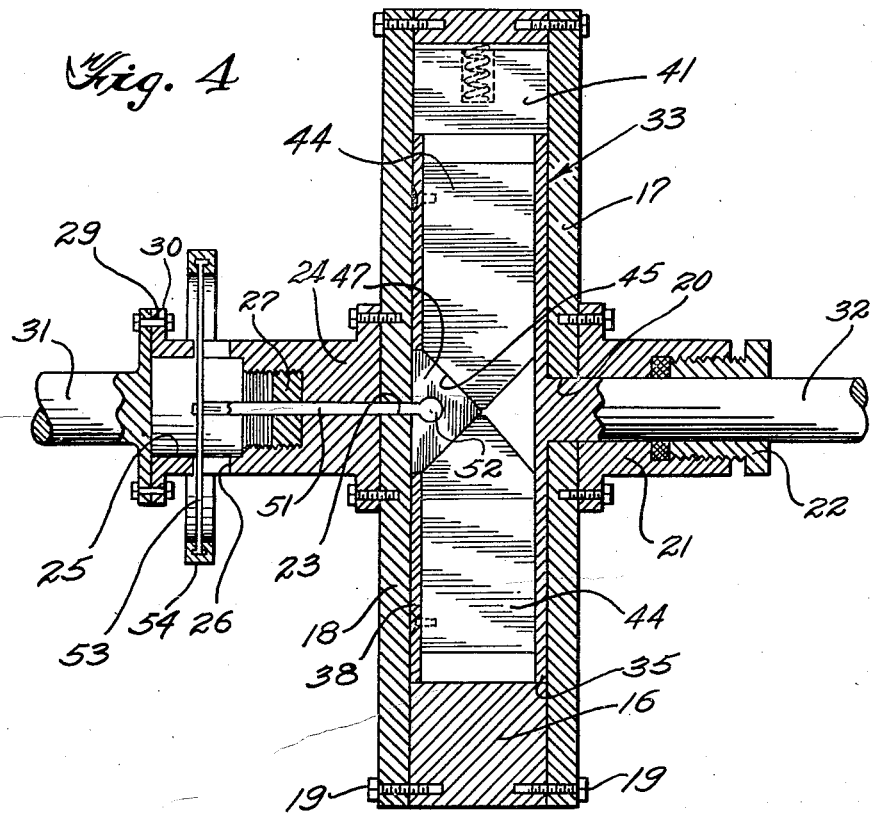
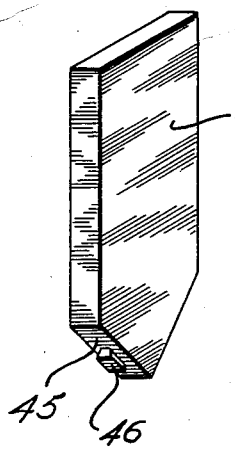
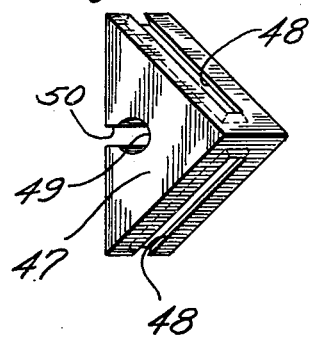
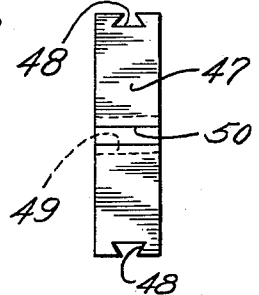
Inventor
ROBERT A. PYLE
By *Clarence A. O'Brien*
*and Harvey B. Jacobson*
Attorneys Patented Oct. 12, 1948

2,451,118

UNITED STATES PATENT OFFICE 2,451,118

FLUID TRANSMISSION

Robert A. Pyle, Lapeer, Mich.

Application November 20, 1945, Serial No. 629,782

1 Claim. (Cl. 192—58)

This invention relates to a fluid transmission and has for its primary object to produce an infinite number of speed and torque ratios between a driven and a drive shaft.

Another object is to effect a smooth transition between the varying speeds so as to permit the speed of the driven shaft to be varied without shock or vibration.

The above and other objects may be attained by employing this invention which embodies among its features a casing having a circular chamber therein, an elliptical rotor mounted to rotate about the axis of the chamber, radial vanes in the walls of the chamber yieldingly held in contact with the rotor, said rotor having passages in opposite ends, a non-compressible fluid filling the spaces between the rotor and the wall of the chamber and means for varying the cross-sectional area of the passages whereby the resistance to the passage of fluid from one side of the rotor to the other when either the rotor or chamber is rotated may be controlled.

Other features include sliding vanes in the rotor for varying the cross-sectional area of the passages and means on the exterior of the device for governing the position of the sliding vanes.

In the drawings:

Figure 1 is a side view of a fluid transmission embodying the features of this invention, Figure 2 is an end view thereof, Figure 3 is a transverse sectional view taken substantially on the line 3—3 of Figure 1, Figure 4 is a longitudinal sectional view taken substantially on the line 4—4 of Figure 2, Figure 5 is a perspective view of one of the members going to make up the rotor, Figure 6 is an edge view of the rotor showing the parts thereof disassembled, Figure 7 is a perspective view of one of the vanes in the casing, Figure 8 is a perspective view of one of the vanes employed in the rotor.

Figure 9 is a perspective view of the rotor vane controlling wedge, and

Figure 10 is a side view of the rear side of the wedge shown in Figure 9.

Figure 1:
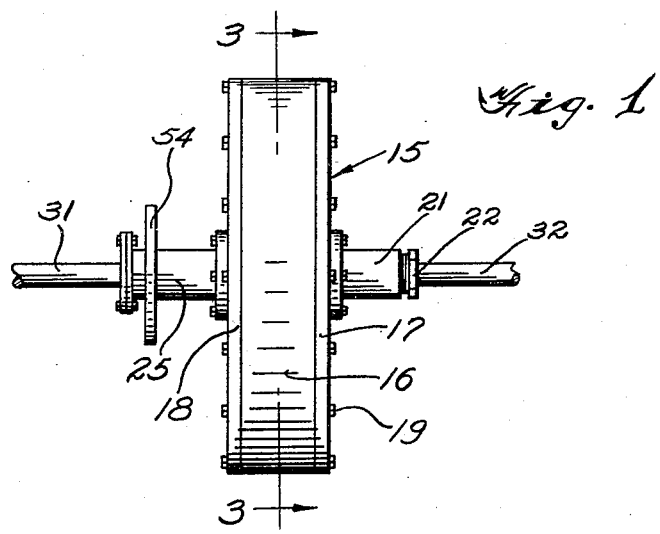
Figure 2:
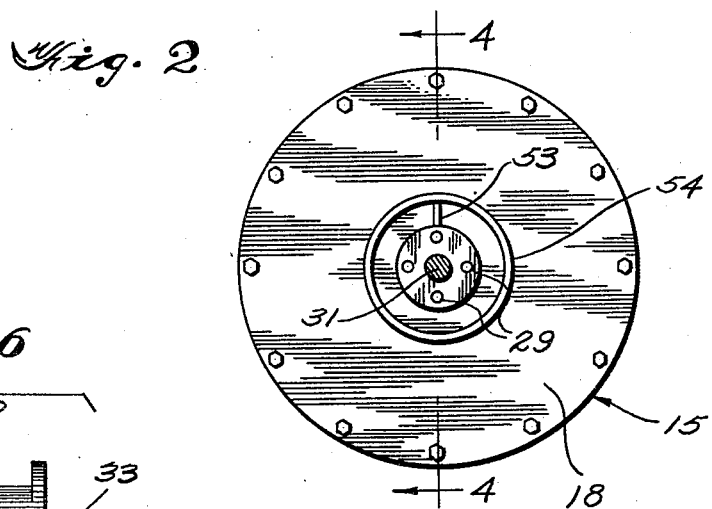

Referring to the drawings in detail my improved transmission designated generally 15 comprises a ring shaped casing 16 to which end closing plates 17 and 18 are adapted to be attached in any suitable manner as by cap screws 19. Formed in the end plate 17 is an axial opening 20 and attached to the outer face of the plate 17 in concentric relation to the opening 20 is a sleeve 21 carrying at its outer end a packing gland 22 to form a fluid tight joint around the rotor shaft to be more fully hereinafter described. Formed in the end plate 18 in axial alignment with the opening 20 is an opening 23 which is surrounded by an outstanding sleeve 24 formed near its outer end with an enlarged chamber 25 through the wall of which diametrically opposite one another are longitudinal slots 26 for a purpose to be more fully hereinafter described. A packing gland 27 is arranged at the inner end of the chamber 25 and attached as by bolt 29 to a flange 30 formed at the outer end of the sleeve 25 is a driven shaft 31. It will thus be seen that the shaft 31 will rotate in unison with the casing 15.

Figure 6:
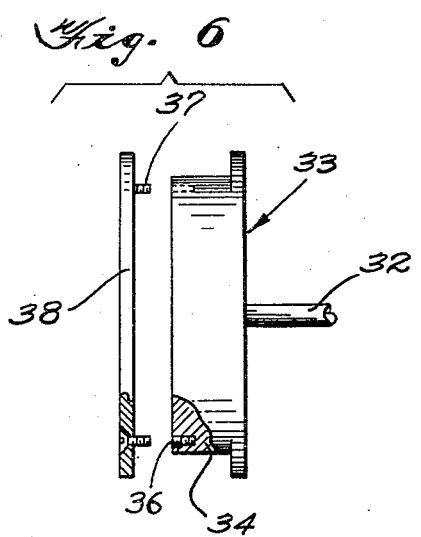
Figure 5:
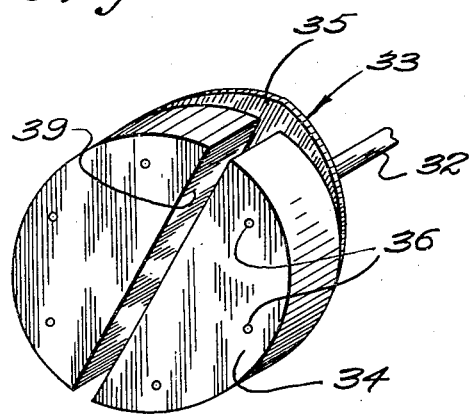
Figure 7:
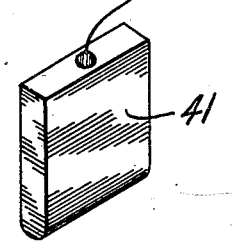

Mounted for rotation in the opening 20 and sleeve 21 is a drive shaft 32 carrying at its end which is disposed within the casing 15 a rotor designated generally 33. The rotor 33 comprises a body 34 of elliptical cross section provided at one end with an elliptical flange 35, the major axis of which lies in the plane of the major axis of the body 34, and the end of the body 34 opposite that carrying the flange 35 is provided with internally screw-threaded openings 36 for the reception of flat head screws 37 by means of which a plate 38 of a contour conforming to the contour of the elliptical flange 35 may be attached to the body 34 as illustrated in Figures 4 and 6. The rotor body 34 is provided with a slot 39 in which the rotor vanes, to be more fully hereinafter described, are slidably mounted. This slot extends through the body 34 in longitudinal alignment with its major axis as will be readily understood upon reference to Figure 5.

Figure 3:
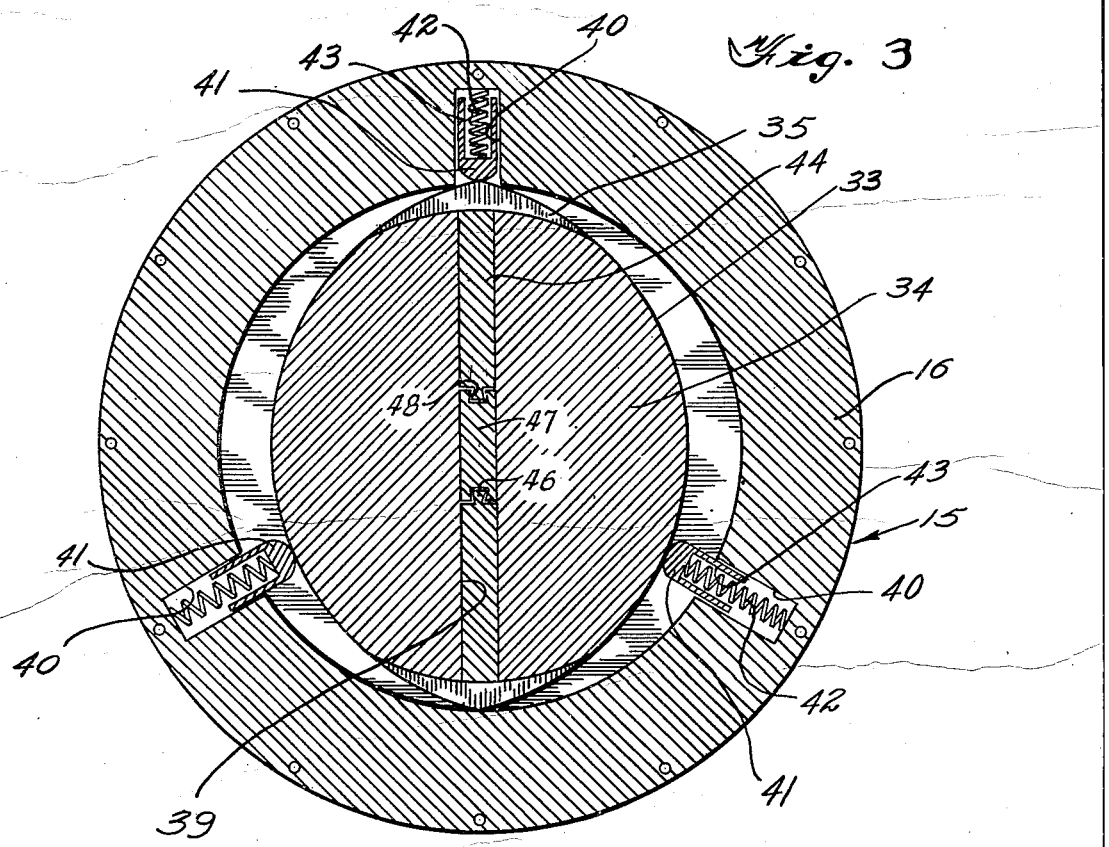

Formed in the ring shaped body 16 are inwardly opening radial slots 40 in which inwardly extending radial vanes 41 are slidably mounted. These vanes are of a width equal to the entire width of the body 16 and their inner ends are adapted to ride against the rotor 33. Compression coil springs 42 are seated in openings 43 in the vanes 41 and the outer ends of the springs 42 bear against the bottom walls of the slots 40 so that the vanes 41 will yieldingly be urged into contact with the rotor as illustrated in Figure 3. It is also to be noted that as the flange 35 and the elongated ends of the plate 38 rotate within the ring shaped body 16 the vanes 41 will be urged into their respective radial recesses 40 against the compression of the springs 42 so as to allow a clear passage between opposite sides of the rotor.

Slidably mounted in the slot 39 of the rotor body 34 are rotor vanes 44. These vanes are of a width to slide between the flanges 35 and the elongated portions of the plate 38 so that when the vanes 44 are projected beyond the confines of the body 34 a constriction will be formed in the space between the flange 35 and the elongated end of the plate 38. The innermost end of each vane is provided with an angular face 45 carrying a dove-tail 46 and slidably mounted in the slot 39 intermediate its ends is a wedge block 47 having dove-tail grooves 48 for the reception of the dove-tails 46. It will thus be seen that when the block 47 is moved inwardly or outwardly with relation to the rotor body 34 the vanes 44 will be moved inwardly or outwardly according to the direction of movement of the block 47. Extending transversely through the block 47 near its back wall is an opening 49 which communicates through to the back wall through a transversely extending slot 50. Mounted for a longitudinal sliding movement through the opening 23 and the sleeve 25 is a rod 51 carrying a head 52 which is adapted to be received in the opening 49 with the rod 51 projecting through the slot 50. The end of the rod 51 opposite that carrying the head 52 is provided with a pair of radial arms 53 which extend outwardly through the slot 26 and are fitted at their outer ends to rotate in a ring 54.

The operation of the device is as follows: Assuming that the parts have been assembled as illustrated and the space between the rotor 33 and the casing 15 has been filled with a noncompressible fluid, such as oil, it will be obvious that when turning motion is applied to either the shaft 31 or the shaft 32 with the vanes 44 fully retracted, the rotor 33 will rotate within the casing 15, or the casing 15 will rotate about the rotor 33 without imparting motion to the other part, depending upon the amount of load on its respective shaft. If for instance the turning motion is applied to the shaft 32 the rotor 33 will be set in motion and upon moving the ring 54 to advance the wedge 47 into the slot 39 the vanes 44 will be moved radially to close or partially close the passages between the flanges 35 and the elongated end of the disc 38. Such closing of the passages will cause the oil contained in the space between the rotor and the housing to be dammed between the projecting ends of the vanes 44 and the vanes 41. If the vanes 44 are projected a distance sufficiently to close the passages it is obvious that the casing 15 must rotate in unison with the rotor. If the closing is only a portion of the area of the passage it is obvious that some of the oil may be passed through the passage but a proportionate driving effect will be delivered to the casing. It is, of course, obvious that power may be applied to the shaft 31 and the rotor and shaft 32 driven in a like manner.

What I claim is:

In a fluid transmission a casing having a circular chamber therein, a rotor body mounted in the chamber to rotate about the axis thereof, said body having a slot extending diametrically therethrough, an elliptical flange at each end of the body the major axis of which coincides with the longitudinal axis of the slot, circumferentially spaced radial vanes in the wall of the chamber yieldingly held in contact with the rotor body and adapted to be moved out of contact therewith by the flanges as the rotor rotates within the body, a sliding vane mounted in each end of the slot, the inner end of each sliding vane being beveled, a wedge block within the slot and slidable axially of the rotor body and slidably coupled with the beveled ends of the sliding vanes to cause said vanes to move inwardly or outwardly of the rotor body when the wedge block is moved, a rod mounted to move axially through the casing and coupled at its inner end to the wedge block and means exteriorly of the casing for moving the rod axially thereof.

ROBERT A. PYLE.

REFERENCES CITED

The following references are of record in the file of this patent:

UNITED STATES PATENTS

| Number | Name | Date |
|---|---|---|
| 961,043 | Suddoth et al | June 7, 1910 |
| 1,552,023 | Wingquist | Sept. 1, 1925 |
| 2,175,413 | Sharar | Oct. 10, 1939 |

FOREIGN PATENTS

| Number | Country | Date |
|---|---|---|
| 557,600 | France | May 8, 1923 |